United States Patent
Lakshminarayan et al.

(10) Patent No.: US 10,430,411 B2
(45) Date of Patent: Oct. 1, 2019

(54) INCREMENTALLY UPDATING STATISTICS

(71) Applicant: Hewlett-Packard Development Company, L.P., Houston, TX (US)

(72) Inventors: Choudur Lakshminarayan, Austin, TX (US); Ramakumar Kosuru, Austin, TX (US); QiFan Chen, Austin, TX (US); Hansjorg Zeller, Los Altos, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 421 days.

(21) Appl. No.: 14/787,326

(22) PCT Filed: Apr. 30, 2013

(86) PCT No.: PCT/US2013/038895
§ 371 (c)(1),
(2) Date: Oct. 27, 2015

(87) PCT Pub. No.: WO2014/178851
PCT Pub. Date: Nov. 6, 2014

(65) Prior Publication Data
US 2016/0110417 A1    Apr. 21, 2016

(51) Int. Cl.
G06F 17/30    (2006.01)
G06F 17/18    (2006.01)
G06F 16/2453    (2019.01)
G06F 16/23    (2019.01)
G06F 16/188    (2019.01)

(52) U.S. Cl.
CPC ...... *G06F 16/24542* (2019.01); *G06F 16/196* (2019.01); *G06F 16/23* (2019.01); *G06F 17/18* (2013.01)

(58) Field of Classification Search
CPC ................................................ G06F 17/30463
See application file for complete search history.

(56) References Cited

U.S. PATENT DOCUMENTS

| | | |
|---|---|---|
| 6,529,901 B1 | 3/2003 | Chaudhuri et al. |
| 6,738,755 B1 | 5/2004 | Freytag et al. |
| 7,124,146 B2 | 10/2006 | Rjaibi et al. |

(Continued)

FOREIGN PATENT DOCUMENTS

| | | |
|---|---|---|
| CN | 102135989 A | 7/2011 |
| CN | 102483738 A | 5/2012 |

OTHER PUBLICATIONS

Mara, Constance A., and Robert A. Cribbie. "Paired-samples tests of equivalence." Communications in Statistics-Simulation and Computation 41.10 (2012): 1928-1943.*

(Continued)

*Primary Examiner* — Usmaan Saeed
*Assistant Examiner* — William P Bartlett (57) ABSTRACT

Incrementally updating statistics includes sampling rows from a database column in a database to generate a first sample, sampling a subset of modified rows from the database column after generating the first sample to generate a second sample, determining whether distribution changes occurred to the database column based on the first and second samples, and updating a database statistic about the database column in response to determining that a distribution change exists.

15 Claims, 7 Drawing Sheets

(56) References Cited

U.S. PATENT DOCUMENTS

| | | |
|---|---|---|
| 7,177,864 B2 | 2/2007 | Ekhaus |
| 7,739,293 B2 | 6/2010 | Lightstone et al. |
| 8,386,450 B2 | 2/2013 | Simmen |
| 8,392,406 B1 | 3/2013 | Emekci et al. |
| 2003/0229617 A1* | 12/2003 | Rjaibi ............... G06F 17/30469 |
| 2007/0129112 A1 | 6/2007 | Tarn |
| 2007/0180411 A1* | 8/2007 | Swegat ............. G01R 31/2894 716/136 |
| 2008/0114801 A1 | 5/2008 | Surinder |
| 2008/0120275 A1 | 5/2008 | Cruanes et al. |
| 2008/0133454 A1* | 6/2008 | Markl ............... G06F 16/24539 |
| 2009/0083215 A1 | 3/2009 | Burger |
| 2009/0192980 A1* | 7/2009 | Beyer ............... G06F 17/30469 |
| 2009/0240714 A1 | 9/2009 | Edward |
| 2011/0055198 A1 | 3/2011 | Mitchell |
| 2011/0252020 A1 | 10/2011 | Lim |
| 2012/0084287 A1 | 4/2012 | Lakshminarayan et al. |
| 2013/0262368 A1* | 10/2013 | Wolff ..................... G06F 17/18 706/52 |

OTHER PUBLICATIONS

Argarwal S. et al, "BlinkDB. Queries with Bounded Errors and Bounded Response Times on Very Large Data", Mar. 25, 2012.

Graham, C et al, "Synopses for Massive Data" Samples, Histograms, Wavelets, Sketches, Jan 2011.

Extended European Search Report dated Jan. 5, 2017 for EP Appication No. 13883628.3; pp. 11.

Gibbons P B et al. New Sampling-Based Summary Statistics for Improving Approximate Query Answers; Jun. 1998.

Unknown. Best Practices for Gathering Optimizer Statistics; Apr. 2012.

Unknown. Understanding Optimizer Statistics; Jan. 2012.

\* cited by examiner

INCREMENTALLY UPDATING STATISTICS

BACKGROUND

In some types of databases, such as relational databases, a query plan optimizer uses statistics about the database's data. In response to receiving a query, multiple query plans are generated about how to search the database. The query plan optimizer makes decisions about which of these query plans will result in searching the database according to the terms in the search query in a minimal amount of time. Reliance on database statistics allows a search query optimizer to select query plans without having to calculate information about the database's data from scratch.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

To provide the query optimizer beneficial statistical information, the statistics are updated. However, updating the statistics results in a drain on the databases power and processing resources. In some cases, such updating hinders the performance of other operations as resources are made available to update the statistics.

The principles described herein include a mechanism for updating the statistics utilizing less work and estimating the statistics based on samples when the database's data distribution has been determined to have statistically remained unchanged. The mechanism determines what data in the database has changed enough to merit updating the statistics instead of just estimating the statistics based on samples.

These principles include a method for incrementally updating database statistics. Such a method includes sampling rows from a database column in a database to generate a first sample, subsequently sampling a subset of modified rows from the database column after generating the first sample to generate a second sample, determining whether distribution changes occurred to the database column based on the first and second samples, and updating a database statistic about the database column in response to determining that a distribution change exists. The modified rows may include deleted rows, inserted rows, updated rows, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
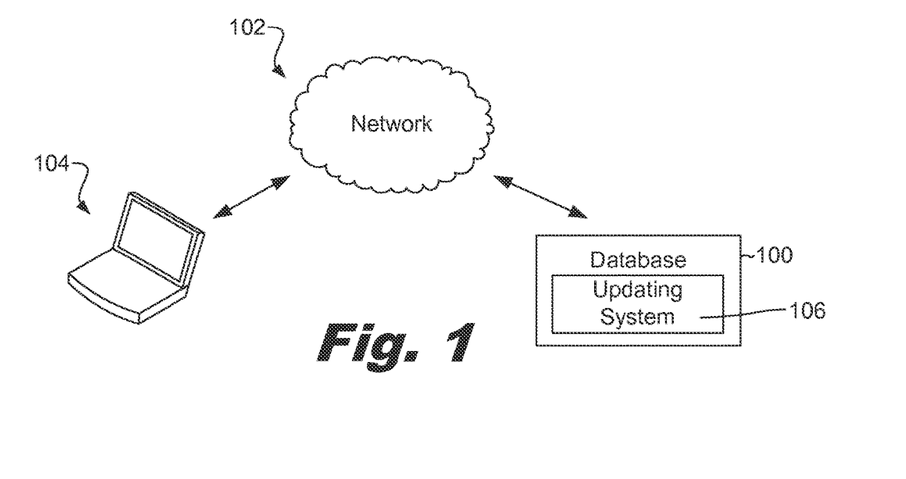
FIG. 1 is a diagram of an example of a database on a network according to the principles described herein.

FIG. 1 is a diagram of an example of a database (100) on a network (102) according to the principles described herein. In this example, a client device (104) is in communication with the network (102) that is in communication with the database (100).

The client device (104) may be any appropriate device that the user can use to communicate with the database (100). For example, the client device (104) may be a laptop, a personal computer, a desktop, a phone, an electronic tablet, an electronic device, another type of client device, or combinations thereof.

A user may input a search query into a search query field that is displayed in a monitor of the client device (104). Based on the terms of the search query, a query plan generator generates multiple query plans that can be used to search the database (100) to find appropriate search results from the database's contents. A query plan optimizer selects one of the query plans that the query plan optimizer determines will take a minimal amount of time to search the database's contents. The query plan optimizer makes the decision to select a query plan at least in part based on statistics that are stored in the database (100) and that describe the database's contents. For example, the database (100) may store historgrams, a row count, unique entry counts, other statistics, or combinations thereof to describe the columns of information in the database (100). Such statistics save the query plan optimizer from re-computing summary information about the data in the columns.

The statistics about the database column can be estimated based on samples to spare the database from devoting a significant amount of resources to update large amounts of statistics when there has been little change to the database's data. The database (100) includes an updating system (106) that updates at least one of the statistics describing at least one of the database columns when appropriate. An appropriate time to update a statistic is when the statistics distribution has a statistical change.

The updating system (106) can take samples of the data in the database's columns over time and compare the samples against each other. If the samples exhibit a significant statistical difference, the updating system (106) may determine it is appropriate to update the statistics instead of estimating the statistics based on samples. Further, the updating system (106) may also determine the level of confidence for concluding that a significant statistical difference between the samples exists. A predetermined confidence threshold may include a ninety five percent confidence or some other confidence level that is to be exceeded before the updating system will cause one of the statistics to be updated.

While this example has been described with reference to specific locations of databases, query plan generators, query plan optimizers, updating systems, and other components, these components may be located in any appropriate location in accordance with the principles described herein. For example, the updating system may be located on a network component other than the database or on the client device. Also, the query plan generator and query plan optimizers may also be located on a network component other than the database or on the client device.

Figure 2:
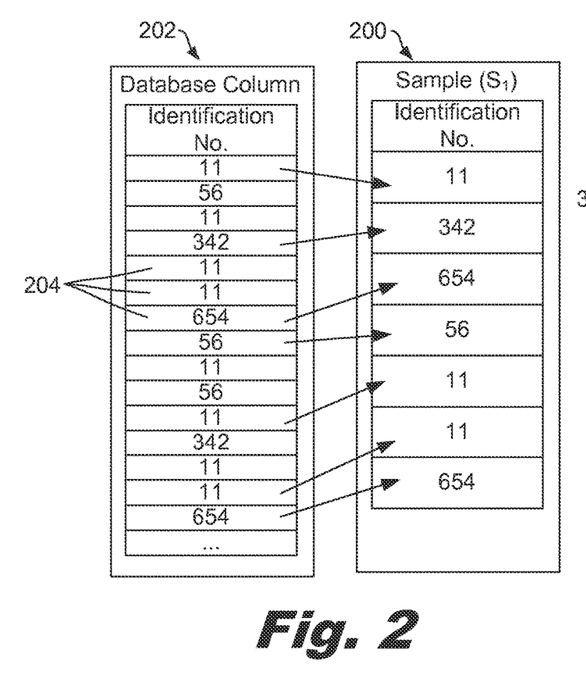
FIG. 2 is a diagram of an example of a sample of a database column according to the principles described herein.

FIG. 2 is a diagram of an example of a sample (200) of a database column (202) according to the principles described herein. In this example, the database column (202) includes multiple rows (204) that store information. The database may include additional columns of information. The database column's rows (204) may include any appropriate number of rows. In some examples, the database column (202) may include from just a couple of rows to billions of rows.

The database also includes statistics associated with the rows, such as the number of rows, the unique entry count, other statistics, or combinations thereof. These statistics may be used with a query plan optimizer that selects a query plan that will take a minimal amount of time to execute.

The histogram collection is performed through the update statistics statement that computes the pair of values of unique entry count, row count for disjoint intervals over a range of the column values. The update statistics statement is a time consuming operation, and uses significant resources from the database's memory, central processing unit, and input/output because it uses a "group-by" operation as well as a "sort" operations to compute the unique entry count of a column. Database management systems utilize sampling so as to reduce the cost of this operation. This, in turn, reduces the size of input and improves response times.

The updating system takes a sample (200) of the rows from the database column on a first day. The sample (200) may be a random sample of the rows from the database column (202). Taking the sample (200) may include copying the value of the selected rows into a sample column. In some examples, the sample includes at least one percent of all of the rows from the database column (202). For example, if the database column has a million rows, the sample table will include at least ten thousand rows containing values copied from the selected rows of the database column (202). In some examples, the sample includes more than one percent of the database column's rows (204).

The updating system may calculate at least some statistics describing the database column based on the sample (200). For example, the updating system may estimate a unique entry count statistic based on the sample.

While this example has been described with reference to a specific number of rows in a database column and sample sizes, any appropriate number of rows and sample sizes may be used in accordance with the principles described herein. Further, the updating system may take a sample of multiple database columns and estimate statistics for each of the sampled database column based on their corresponding samples.

Figure 3:
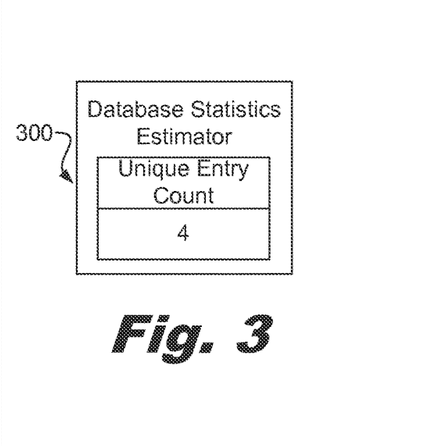
FIG. 3 is a diagram of an example of a unique entry count estimator according to the principles described herein.

FIG. 3 is a diagram of an example of a unique entry count estimator (300) according to the principles described herein. In this example, the unique entry count estimator (300) of the updating system estimates the unique entry count based on the samples (200, FIG. 2). The unique entry count represents the unique values in the sample (200, FIG. 2). For example, three of the rows in the sample (200, FIG. 2) include a value of 11. Thus, 11 constitutes a single unique entry count. One row includes a value of 342. Thus, 342 constitutes a single unique entry count. Two rows include a value of 654. Thus, 654 constitutes a single unique entry count. Further, one row includes a value of 56. Thus, 56 constitutes a single unique entry count. As a result, in the example of FIG. 3, the value of the unique entry count is 4.

Figure 4A:
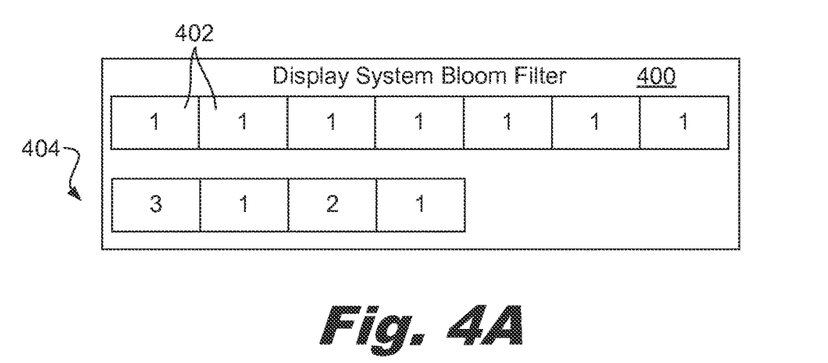
FIG. 4A is a diagram of an example of a bloom filter according to the principles described herein.

FIG. 4A is a diagram of an example of a bloom filter (400) according to the principles described herein. In this example, the bloom filter (400) is a data structure that includes a bitmap (402) of registers that represent the rows of the sample (200, FIG. 2). Each of the registers represents a binary value from the sample values. If there is a value greater than zero in the sample's row, the corresponding bloom filter register will store a 1 value. On the other hand, if the sample row has a value of zero, than the corresponding bloom filter register will store a 0. In addition to the bitmap (402), the bloom filter also includes counters (404) that represent the unique entry count from the sample. For example, the sample includes three entry counts with the unique value of 11. Thus, one of the counters (404 holds a value of 3. Also, the sample includes two entry counts of 654, thus, another counter (404) holds a value of 2. Further, the sample also includes single unique values of 342 and 56, so two other counters (404) hold a value of 1 to represent these unique entry counts. The counters (404) of the bloom filter represent a data distribution of the sample.

Figure 4B:
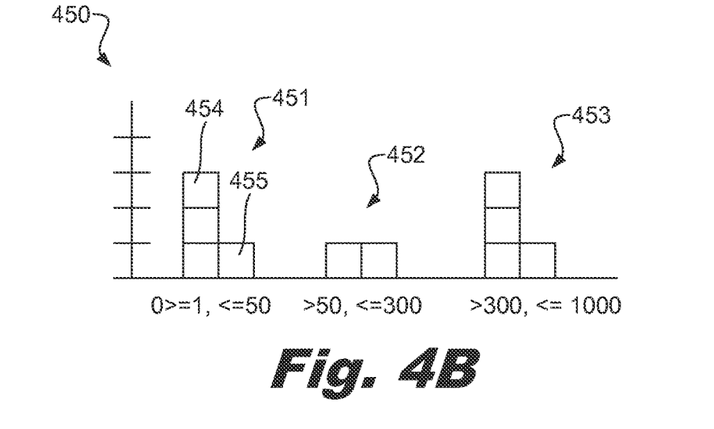
FIG. 4B is a diagram of an example of a histogram according to the principles described herein.

FIG. 4B is a diagram of an example of a histogram (450) according to the principles described herein. In this example, the histogram (450) also represents a data distribution of the sample. The data of the sample is divided into value ranges. A first value range (451) covers from zero to fifty, the second value range (452) covers a range from greater than fifty to three hundred, and a third value range (453) covers a range from greater than three hundred to one thousand. The first column (454) in each value range (451, 452, 453) represents the total rows in the sample that include a value within the appropriate value range. The second column (455) in each value range (451, 452, 453) represents the unique entry count for those rows within the appropriate value range. In this example, the updating system references the histogram (450) to determine the distribution of the database column based on the distribution in the histogram, which represents the distribution of the sample.

Figure 5:
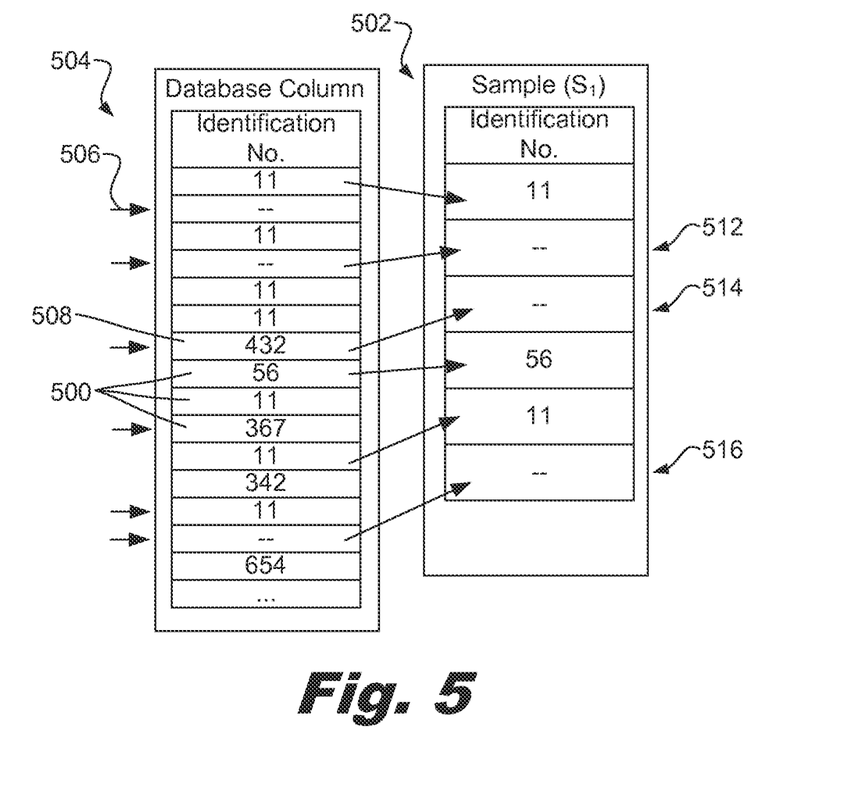
FIG. 5 is a diagram of an example of deleting rows from a sample of a database column according to the principles described herein.

FIG. 5 is a diagram of an example of deleting rows (500) from a sample (502) of a database column (504) according to the principles described herein. In this example, time has passed from the moment that the first sample (502) was taken. For example, the first sample can be taken on a first day, and the changes to the first sample may be analyzed after an hour, multiple hours, a day, multiple days, a week, another time period, or combinations thereof. During the passage of time, the database column (504) experienced changes as rows (500) in the database column (504) are deleted and additional rows are inserted. Such changes can occur when an update procedure is performed on the database column (504). Also, such changes may results after a user manually inserts or deletes rows (500) in the database column. Each of the rows in the example of FIG. 5 that were deleted are marked with an arrow (506). Row (508) of the database column (504) was replaced with an inserted row, so the row (508) appears to have a changed value even though row (508) were deleted since the first sample (502) was taken.

Each of the rows that are already included in the sample (502) that correspond to a deleted row in the database column (504) is deleted from the sample (502). In this example, rows (512, 514, 516) of the sample (502) are deleted from the sample (502) to reflect the changes in the database column (504).

Figure 6:
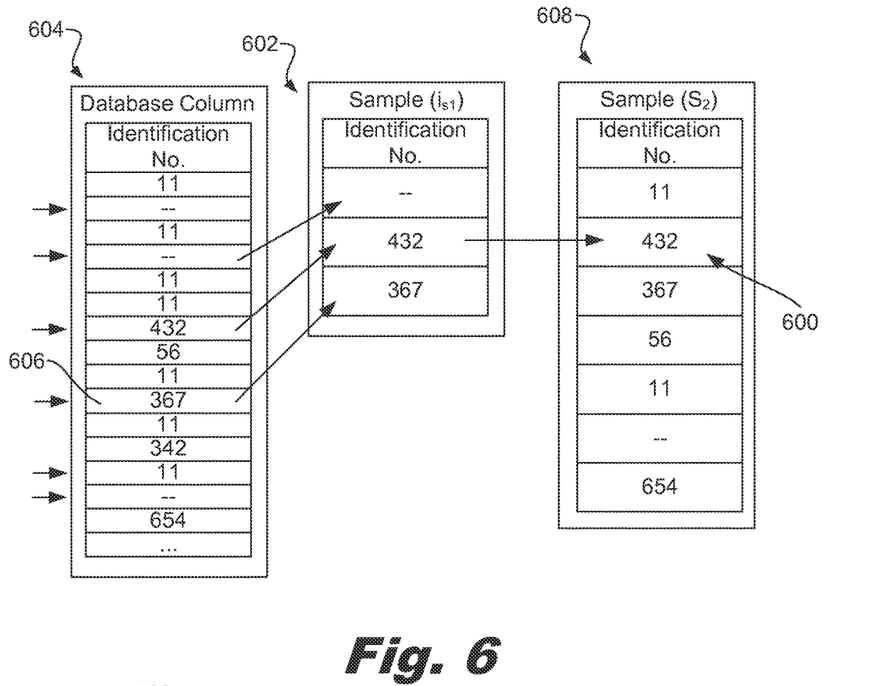
FIG. 6 is a diagram of an example of adding inserts into a sample of a database column according to the principles described herein.

FIG. 6 is a diagram of an example of adding inserts (600) into a sample (602) of a database column (604) according to the principles described herein. In this example, a random sample of just the deleted rows in the database column (604) is taken. The values of the rows are represented in the sample table. In this example, the sample (602) includes three rows where two of the rows have a value of zero, while sample row (606) has a value greater than zero. Each of the rows that have a value greater than zero is inserted into the sample that was previously modified to reflect the deleted rows in the database column (604). In this example, just sample row (606) is inserted into the sample. With the sample now reflecting the deletions and insertions that occurred since the sample was originally taken, the sample is now classified as a second sample (608).

Figure 7:
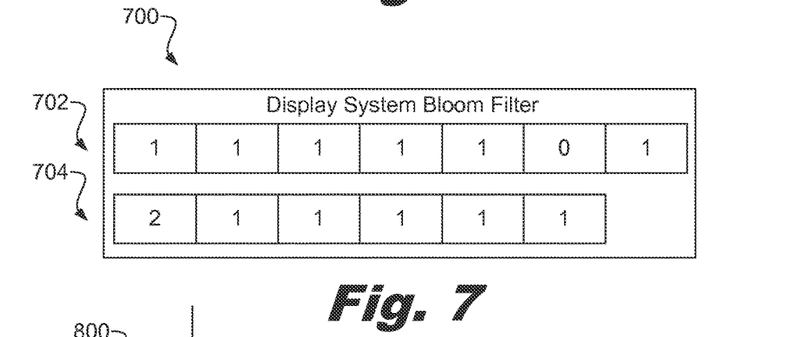
FIG. 7 is a diagram of an example of a bloom filter according to the principles described herein.

FIG. 7 is a diagram of an example of a bloom filter (700) according to the principles described herein. In this example, the registers of the bitmap (702) of the bloom filter (700) hold a "1" when the values of the row count from the second sample (608, FIG. 6) are greater than zero. Since one of the rows in the sample was deleted, its corresponding register holds a value of "0." The counters (704) also represent the unique entry counts found in the second sample, (608, FIG. 6).

The updating system compares the distributions of the bloom filters to determine the existence of distribution differences. For example, the updating system may compare the distribution of the unique entry count from the counters of the bloom filter (700, FIG. 7) that represents the second sample (608, FIG. 6) against the distribution of the unique entry count of the bloom filter (400, FIG. 4A) that represents the first sample (200, FIG. 2). Here, the distributions are different because bloom filter (400, FIG. 4A) has a different of unique entry count. In response to finding a distribution change, such as the changes in the unique entry counts, the updating system determines that the statistics that were estimated with the first sample (200, FIG. 2) are to be updated. In other examples, if the comparison of the bloom filters yields no statistical distribution change, the updating system determines to continue to estimate the statistic based on the samples. In some examples, the updating system uses the row counts from the bitmaps of the bloom filters to determine whether a distribution change has occurred.

Figure 8:
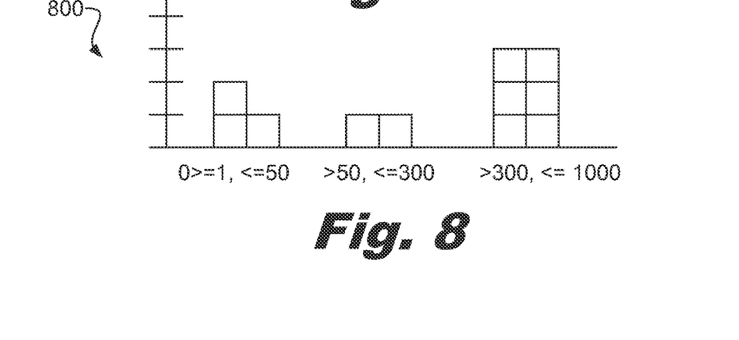
FIG. 8 is a diagram of an example of a histogram according to the principles described herein.

FIG. 8 is a diagram of an example of a histogram (800) according to the principles described herein. In this example, the histogram (800) represents the distribution of the updated sample. The updating system compares the distributions of the histogram in FIG. 4B (450, FIG. 4B) to the distribution of the histogram (800) in FIG. 8. The updating system may compare the distribution of the unique count entry, the distribution of the row count, the frequency of frequencies per histogram interval, the entire histogram statistics, another statistic detailed in the histogram, or combinations thereof. If a change in the distribution of the selected statistic exists, the updating system determines to update the statistics for the database column.

While the examples above have been described with specific reference to using bloom filters to determine distribution changes between the first and second samples, any appropriate mechanism may be used to determine the distribution changes. For example, a synopsis table may be used in lieu of the bloom filter or in combination with a bloom filter to determine the distribution changes between the samples. In some examples, other mechanisms are used in lieu of or in combination with synopsis tables and bloom filters. Also, while the examples above have been described with reference to different sample sizes, specific numbers of deleted rows, and specific numbers of inserted rows, any appropriate sample size, number of deleted rows, or number of inserted rows may be used in accordance with the principles described herein.

Figure 9:
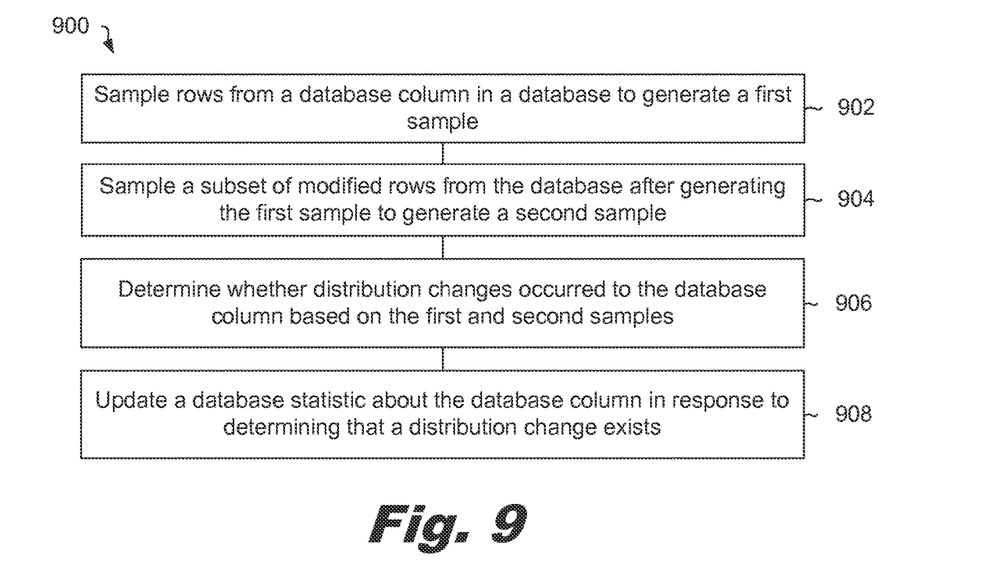
FIG. 9 is a diagram of an example of a method for incrementally updating database statistics according to the principles described herein.

FIG. 9 is a diagram of an example of a method (900) for incrementally updating database statistics according to the principles described herein. In this example, the method (900) includes sampling (902) rows from a database column in a database to generate a first sample, sampling (904) a subset of modified rows from the database after generating the first sample to generate a second sample, determining (906) whether distribution changes occurred to the database column based on the first and second samples, and updating (908) a database statistic about the database column in response to determining that a distribution change exists. The modified rows may include deleted rows, inserted rows, updated rows, or combinations thereof. An update can be represented as a deletion of the old value followed by an insertion of the new value.

The method may include having a population table T where the table T is the database column. A sample table S represents the sample, where S meets the condition of $S \subseteq T$. The cardinality $|S|$ may be at least min (1,000,000, one percent of $|T|$). The table T on a first day is denoted with $T_1$ and the sample table on the first day is denoted with $S_1$. The unique entry count is estimated with $S_1$. On a second day, $T_1$ is updated resulting in a table $T_2$ where $T_2 = T_1 - d_1 + i_1$, where $d_1$ represents the deletes and $i_1$ represents inserts in the population. Correspondingly, $S_2 = S_1 - d_{s1} + i_{s1}$, where $d_{s1}$ represents deletes and $i_{s1}$ represents inserts in the sample table. On Day i, the sample table is given by $S_i = S_{i-1} - d_{si} + i_{si}$, $i = 2, 3, \ldots, n$. Therefore, $S_i$ reflects the distribution of the data on the ith day.

On the first day, the updating system builds table $S_1$ and estimates unique entry counts based on table $S_1$. Further, the updating system builds counting bloom filters for the rows of $S_1$ (one bloom filter per column). For values with high frequencies, the counters may overflow. Accordingly, the updating system may keep a separate synopsis table for such values. The updating system persist $S_1$ onto the counting bloom filters and the synopsis tables.

On the second day, the updating system deletes rows from $S_1$. These rows are denoted as $d_{s1}$. The updating system also takes a random sample of rows from table T. This random sample is $i_{s1}$, which is added to $S_1$ to generate $S_2$. The random sample is composed of observations that avoid deleted samples in $T_1$ and a sample of inserted observations. The number of inserts that occurred between the (i−1)th and ith days is may be tracked and stored by the updating system. So, a random sample from $T_1$ provides access to the inserts. If the updating system tracks the proportion of inserts between updates, the insert sample can be drawn in proportion to the rest of the data distribution.

Additionally, on the second day, for every row in $d_{s1}$, the updating system decrements the corresponding counters in the bloom filters and the synopsis table to a lower value.

Likewise, For every row in $i_{s1}$, the updating system increments the corresponding counters in the bloom filter and the synopsis table to a higher value. The counting bloom filter provides new values for the frequencies and the synopsis table provides a new list of skew elements. The updating system also persists $S_2$ onto the updated counting bloom filter and the synopsis table.

The updating system proposes an inference test of hypothesis to incrementally update the unique entry count on the ith day. The null hypothesis is that the skewness statistic has not changed. If the null hypothesis is rejected such that there is a change in skewness (the distribution) between days "i–1" and "i", then the updating statistic determines to redo the update statistics from the database column. On the other hand, if the null hypothesis is not rejected, which suggests that the data distribution has not changed, the updating system updates the unique entry count based on an incremental dataset, which is a sample from the superset. More precisely, let $\{x_{11}, x_{12}, \ldots x_{1n}\}$ be a random sample drawn from column X of $S_{i-1}$, and $\{x_{21}, x_{22}, \ldots, x_{2n}\}$ be a random sample drawn from column X of $S_i$. Based on the random samples, the updating system tests for differences in skewness from the two random samples. If there is no statistical difference in the skewnesses at ninety five percent confidence level, the data distribution will remain unchanged despite the series of deletes and inserts. In such an example, the updating system incrementally estimates the unique entry count based on the incremental data going from $S_{i-1}$ to $S_i$ (the changes between the (i-1)th and ith days). The incremental data on the ith day is not $S_i$, but a sample resulting from a superset of $(T_i, 2)$.

Updating the statistics incrementally may include multiple conditions. If the row count to unique entry count ratio remains invariant across updating cycles in the incremental samples, then the unique entry count can be scaled linearly to find the unique entry counts in $S_i$. Further, if there is a change in the skewnesses going from $S_i$-1 to $S_i$, then the updating system can initiate a unique entry count with a linear weight combination estimator on the sample $S_i$. Also, if the incremental sample is very large, i.e., much larger than 0.1% of |T|, a bloom filter implementation can be used in accordance with the principles described herein.

In some examples, the values of column X are split into histogram intervals and this solution to estimate the unique entry count incrementally can be applied to individual intervals. For example, the histogram interval may include two hundred intervals, so the estimator works with just 1/200th of the sample size.

The confidence level can be determined through statistical tests. The tests may be performed with the histogram, the bloom filter, another mechanism, or combinations thereof. The row count, the unique entry count, other statistical data, or combinations thereof can be used to determine the confidence level. The statistical tests may include parametric tests, non-parametric tests, other types of rests, or combinations thereof.

The comparison includes samples taken before the updates (inserts, and deletes) in time period (t–1) and samples after the updates in time period in (t). Consider the random samples $S_{i-1}$ and $S_i$, in two consecutive periods and let $f_{i-1}$ and $f_i$, represent frequencies defined as follows: It is the quantity that tracks the frequency of observations (considered as a class) that occurs exactly "i" times. Unique entry count computations are intimately related to the distribution of the frequencies (f). Changes in the quantity induce skewness in the distribution. The confidence engine evaluates the degree of change in the skewness to determine if a unique entry count recomputation is warranted. In the implementation of the confidence engine, the following assumptions are made: 1) deletes and Inserts occurred in the periods $t_{i-1}, t_{i,2}$ the sampled data is Gaussian Distributed, and 3) the samples drawn are independent.

For parametric tests, let $x_{11}, x_{21}, \ldots, x_{n1}$ be a random sample of size n from a normal population $N(\mu_1, \sigma_1^2)$ and $x_{12}, x_{22}, \ldots x_{m2}$ be a random sample of size m from a normal population $N(\mu_2, \sigma_2^2)$, where $\sigma_1^2$ and $\sigma_2^2$ are unknown from periods $t_{i-1}, t_1$. Also assume that the samples are independent.

Suppose the hypothesis $H_0$: $\mu_1 = \mu_2$ versus $H_1$: $\mu_1 \neq \mu_2$. The test can be modified to test whether or not $H_0$: $\mu_1 - \mu_2 = 0$ versus $H_1$: $\mu_1 - \mu_2 \neq 0$. Since the population variances are unknown, we replace them by their sample estimates $s_1^2$ and $s_2^2$. The sample variances are computed using the formulas:

$$s_1^2 = \frac{1}{n-1}\sum_{i=1}^{n}(x_{i1} - \overline{x}_1)^2 \text{ and } = s_2^2 = \frac{1}{m}\sum_{i=1}^{m}(x_{2i} - \overline{x}_2)^2.$$

A logical statistic for testing the hypothesis is the difference of statistical means given by $\overline{x}_1 - \overline{x}_2$. The variance of the difference between the means is $$\text{var}(\overline{x}_1 - \overline{x}_2) = \text{var}(\overline{x}_1) + \text{var}(\overline{x}_2) = \frac{\sigma_1^2}{n} + \frac{\sigma_2^2}{m}$$

Assuming that the population variances are equal, $\sigma_1^2 = \sigma_2^2 = \sigma^2$, the sample variances are combined to produce a pooled estimate of the population variance.

$$\text{var}(\overline{x}_1 - \overline{x}_2) = \text{var}(\overline{x}_1) + \text{var}(\overline{x}_2) = \frac{\sigma_1^2}{n} + \frac{\sigma_2^2}{m} = \sigma^2\left(\frac{1}{n} + \frac{1}{m}\right)$$

The variance $\sigma^2$ is estimated by the pooled sample variance:

$$S_{pooled}^2 == \frac{(n-1)S_1^2 + (m-1)S_2^2}{n+m-2}.$$

The test statistic is given as:

$$t = \frac{(\overline{x}_1 - \overline{x}_2) - (\mu_1 - \mu_2)}{\sqrt{s_{pooled}^2\left(\frac{1}{n} + \frac{1}{m}\right)}} \sim t_{n+m-2}$$

A two sample t-test is applicable for small sample sizes. A t-statistic is appropriate when the population variances $\sigma_1^2$ and $\sigma_2^2$ are equal. The verification of this assumption involves performing the test for equality of variances. If the variances of the two populations are unequal, the t-test is modified. This test is also known as the Behrens-Fisher test. The t-test is also valid for comparison of independent samples.

A paired t-test is a statistical test for comparing the distribution changes at two different times assuming the samples in the two periods are correlated. The test typically involves obtaining measurements on subjects in the before and after periods of making changes to the samples. The hypothesis test may be expressed as $H_0$: $\mu_b=\mu_a$ versus $H_1$: $\mu_b\neq\mu_a$. In some examples, the test may be rewritten as $H_0$: $\mu_D=0$ versus $H_1$: $\mu_D\neq 0$, where $\mu_D=\mu_b-\mu_a$. The test statistic used to test the hypothesis is:

$$t_D = \frac{\bar{x}_D - \mu_D}{s_D/\sqrt{n}} = \frac{\bar{x}_D}{s_D/\sqrt{n}}$$

where $$\bar{x}_D = \bar{x}_b - \bar{x}_a$$

and $S_D$ are standard deviation of the difference of the before and after statistical means. Since the before and after means are correlated, $$\text{var}(\bar{x}_D) = \text{var}(\bar{x}_b - \bar{x}_a) = \text{var}(\bar{x}_b) + \text{var}(\bar{x}_a) - 2\,\text{cov}(\bar{x}_b, \bar{x}_a).$$

The variance of difference of two positively random variables is smaller than the variance of difference of two independent random variables and similarly, if the random variables are negatively correlated, the variance of the difference tends to be larger. Thus the t-statistic for paired differences adjusts for correlation between measurements. To determine statistical significance between samples relative to frequencies, the absolute value of computed t-statistic is compared with the percentile point of the theoretical t-distribution given by $t_{n-1,\,\alpha/2}$. If $\leq -t_{\alpha/2}$ or $t \geq t_{\alpha/2}$, it is indicative that there is a significant difference in changes for two-sided tests. For one-sided tests, the rejection regions are appropriately adjusted to draw relevant inferences.

Alternately, a non-parametric test that does not rely on normal assumptions on the sampled data is known as the Kolmogorov-Smirnov test (K-S Test), which tries to determine if two datasets differ significantly. The KS-test has the advantage of making no assumption about the distribution of data. The two-sample KS test is a nonparametric hypothesis test that evaluates the difference between the cumulative distribution functions (CDF) of the distributions of the two sample data vectors $S_{i-1}$ and $S_i$ over the range of data in each data set, where the data is a tuple in the data set.

The two-sided test uses the maximum absolute difference between the CDFs of the distributions of the two data vectors. The test statistic is $$D^* = \max_x(|F_1(x) - F_2(x)|),$$

where $\hat{F}_1(x)$ is the proportion of $x_1$ values less than or equal to x, and $\hat{F}_2(x)$ is the proportion of $x_2$ values less than or equal to x (a tuple in the distribution). The test statistic $D^*$ is then used to compute the confidence level of the significance of difference between the samples $S_{i-1}$ and $S_i$. These tests described above are easily applied to Row Counts (RC) in the intervals of the histogram under consideration.

While determining a level of confidence has been described with reference to specific tests, any appropriate test may be used in accordance with the principles described herein. Further, while determine a level of confidence has been described with reference to using specific statistics, any appropriate statistic may be used.

Figure 10:
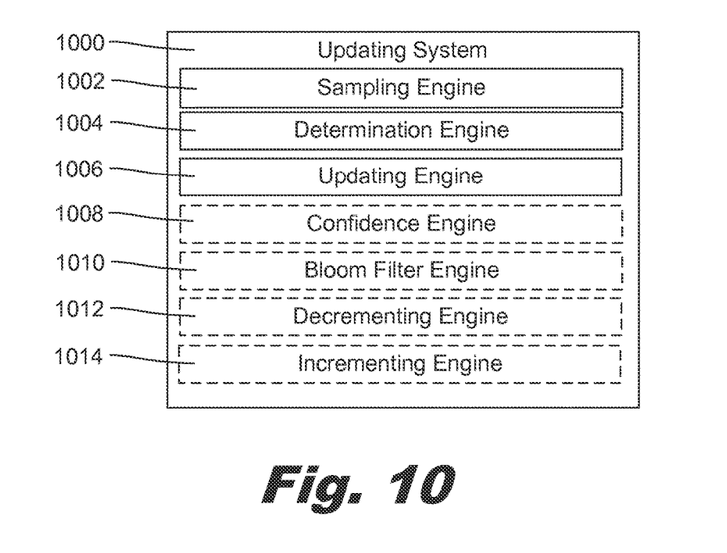
FIG. 10 is a diagram of an example of an updating system according to the principles described herein.

FIG. 10 is a diagram of an example of an updating system (1000) according to the principles described herein. The updating system (1000) has a sampling engine (1002), a determination engine (1004), and an updating engine (1006). In this example, the updating system (1000) further includes a confidence engine (1008), a bloom filter engine (1010), a decrementing engine (1012), and an incrementing engine (1014). The engines (1002, 1004, 1006, 1008, 1010, 1012, 1014) refer to a combination of hardware and program instructions to perform a designated function. Each of the engines (1002, 1004, 1006, 1008, 1010, 1012, 1014) may include a processor and memory. The program instructions are stored in the memory and cause the processor to execute the designated function of the engine.

The sampling engine (1002) samples the database column or portions of the database column to generate samples. The determination engine (1004) determines whether there is a statistical distribution change between samples taken at different times. The updating engine (1006) updates at least one statistic about the database column, such as the unique entry count, if the determination engine (1004) determines that there is a distribution change. Otherwise, the updating system (1000) will estimate the statistic based on the latest sample.

The confidence engine (1008) determines the level of confidence that the updating system has about its determination that there is a distribution change. The updating engine (1006) may update the statistic just in circumstances when the confidence level is above a predetermined threshold, such as a ninety five percent confidence level.

The bloom filter engine (1010) builds bloom filters and populates the bloom filter's registers based on the initial samples. The decrementing engine (1012) decrements the bloom filter's counter to reflect the deleted rows of the database column. The incrementing engine (1014) increments the counters that correspond to an inserted row in the samples.

Figure 11:
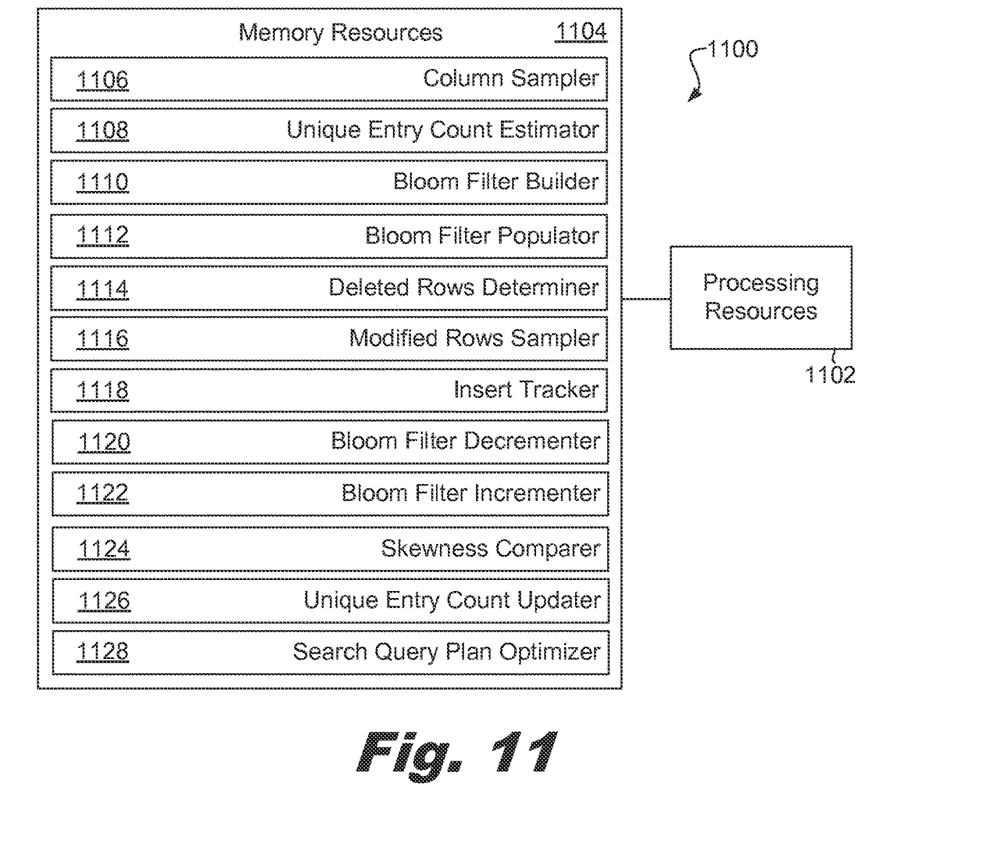
FIG. 11 is a diagram of an example of an updating system according to the principles described herein.

FIG. 11 is a diagram of an example of an updating system (1100) according to the principles described herein. In this example, the updating system (1100) includes processing resources (1102) that are in communication with memory resources (1104). Processing resources (1102) include at least one processor and other resources used to process programmed instructions. The memory resources (1104) represent generally any memory capable of storing data such as programmed instructions or data structures used by the updating system (1100). The programmed instructions shown stored in the memory resources (1104) include a column sampler (1106), a unique entry count estimator (1108), a bloom filter builder (1110), a bloom filter populator (1112), a deleted row determiner (1114), a modified row sampler (1116), an insert tracker (1118), a bloom filter decrementer (1120), a bloom filter incrementer (1122), a skewness comparer (1124), a unique entry count updater (1126), and a search query plan optimizer (1128).

The memory resources (1104) include a computer readable storage medium that contains computer readable program code to cause tasks to be executed by the processing resources (1102). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The column sampler (1106) represents programmed instructions that, when executed, cause the processing resources (1102) to sample a database column. The unique entry count estimator (1108) represents programmed instructions that, when executed, cause the processing resources (1102) to estimate the unique entry count based on the samples taken with the column sampler (1106).

The bloom filter builder (1110) represents programmed instructions that, when executed, cause the processing resources (1102) to build a bloom filter. The bloom filter populator (1112) represents programmed instructions that, when executed, cause the processing resources (1102) to populate the bloom filter's registers based on the population of the sample. The deleted row determiner (1114) represents programmed instructions that, when executed, cause the processing resources (1102) to determine the number of deleted rows from the database column are reflected in the samples. The modified rows sampler (1116) represents programmed instructions that, when executed, cause the processing resources (1102) to sample the modified rows in the database column. The modified rows may include deleted rows, inserted rows, updated rows, or combinations thereof. The insert tracker (1118) represents programmed instructions that, when executed, cause the processing resources (1102) to track the inserts in the database column.

The bloom filter decrementer (1120) represents programmed instructions that, when executed, cause the processing resources (1102) to decrement the bloom filter's counters that correspond to the deleted rows in the sample. The bloom filter incrementor (1122) represents programmed instructions that, when executed, cause the processing resources (1102) to increment the bloom filter's counters that correspond with row inserts in the sample.

The skewness comparer (1124) represents programmed instructions that, when executed, cause the processing resources (1102) to compare the skewness of the distribution of the difference samples. The unique entry count updater (1126) represents programmed instructions that, when executed, cause the processing resources (1102) to update the unique entry count from the database column if the skewness comparer (1124) determines that there is a statistical distribution change in the samples based on the unique count of the bloom filters and/or the histograms. Otherwise, the unique entry count estimator (1108) will continue to estimate the unique entry count based on samples. The search query plan optimizer (1128) represents programmed instructions that, when executed, cause the processing resources (1102) to select a query plan based on the latest unique entry count.

Further, the memory resources (1104) may be part of an installation package. In response to installing the installation package, the programmed instructions of the memory resources (1104) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (1102) and the memory resources (1104) are located within the same physical component, such as a server, or a network component. The memory resources (1104) may be part of the physical component's main memory, caches, registers, non-volatile memory, or elsewhere in the physical component's memory hierarchy. Alternatively, the memory resources (1104) may be in communication with the processing resources (1102) over a network. Further, the data structures, such as the libraries and may be accessed from a remote location over a network connection while the programmed instructions are located locally. Thus, the updating system (1100) may be implemented on a user device, on a server, on a collection of servers, or combinations thereof.

The updating system (1100) of FIG. 11 may be part of a general purpose computer. However, in alternative examples, the updating system (1100) is part of an application specific integrated circuit.

Figure 12:
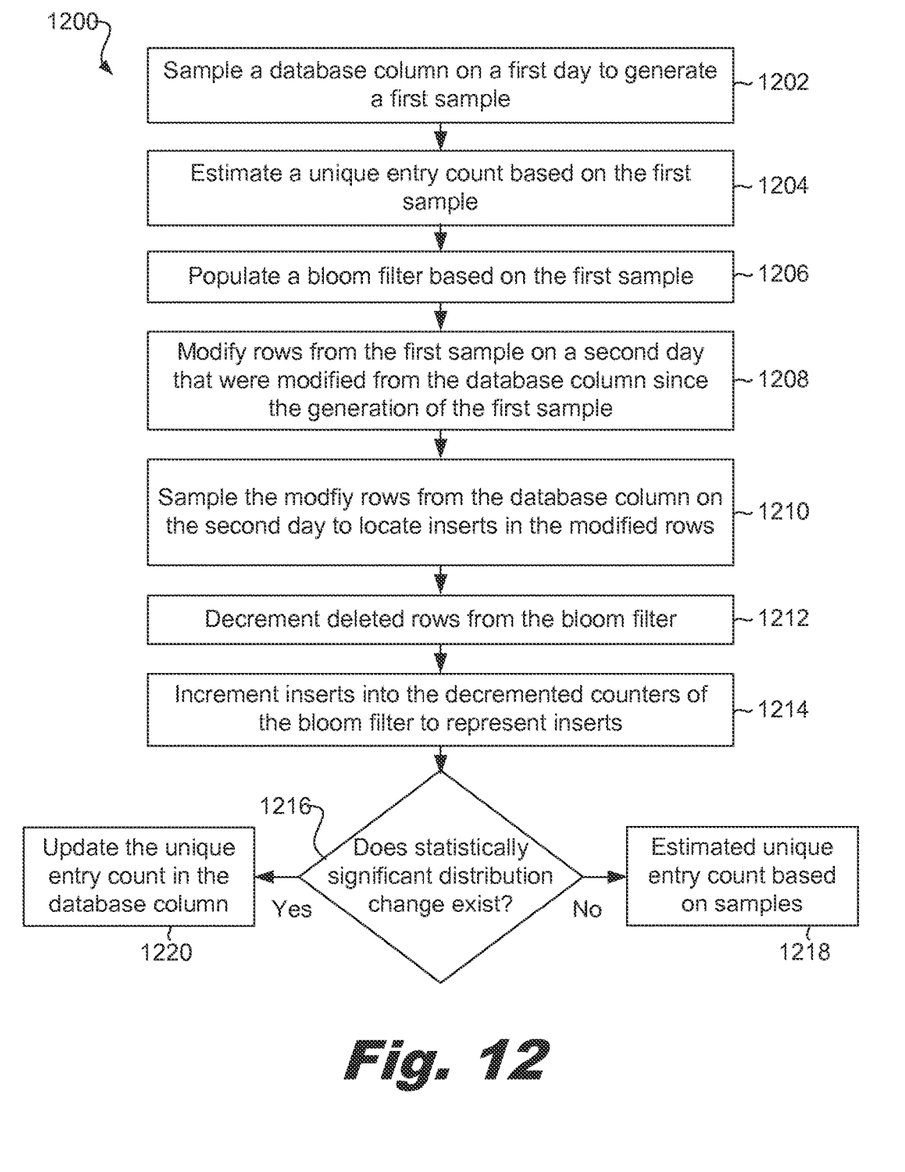
FIG. 12 is a diagram of an example of a flowchart of a process of incrementally updating database statistics according to the principles described herein.

FIG. 12 is a diagram of an example of a flowchart (1200) of a process of incrementally updating database statistics according to the principles described herein. In this example, the process includes sampling (1202) a database column on a first day to generate a first sample and estimating (1204) a unique entry count based on the first sample. The process also includes populating (1206) a bloom filter's registers based on the first sample and recording a unique entry count in the bloom filter's counters. The process further includes modifying (1208) rows, such as deleting, inserting, or updating the rows, in the first sample on a second day that were deleted from the database column since the generation of the first sample and sampling (1210) the modified rows from the database column on the second day to locate inserts in the modified rows. The counters in the bloom filter that correspond to a lower frequency due to the deleted rows in the samples are decremented (1212). Likewise, the counters that correspond to increased frequencies caused by the inserted rows are incremented (1214) to a higher value.

The process also includes determining (1216) whether a statistic distribution change exists between bloom filters representing different samples. If a distribution change is determined to not exists, the process estimates (1218) the unique entry count for the column on the samples. On the other hand, if a distribution change is determined to exists, the process completely updates (1220) the unique entry count in the database column.

While the examples above have been described with reference to specific time durations between generating the first sample and generating the second sample, any appropriate duration may be used in accordance with the principles described herein. Further, while the examples above have been described with reference to specific mechanisms for determining the distribution change, any appropriate mechanism for determining distribution changes may be used in accordance with the principles described herein.

While this example has been described with reference to specific histograms, any appropriate type of histogram may be used in accordance with the principles described herein. Further, while this example has been described with reference to specific bloom fitters, any appropriate type of bloom filter may be used in accordance with the principles described herein. Also, while the examples above have been described with reference to specific types of statistics, any appropriate type of statistic may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method comprising:
sampling, by a processor, rows from a database column in a database to generate a first sample;
sampling, by the processor, a subset of modified rows from the database column after the first sample was generated to generate a second sample corresponding to the first sample, the subset including at least one of deleted rows, inserted rows, and updated rows;
building, by the processor, a first bloom filter that represents rows of the first sample;
building, by the processor, a second bloom filter that represents rows of the second sample;
determining, by the processor, whether distribution changes that exhibit a statistically significant difference occurred to the database column based on a comparison between the first bloom filter and the second bloom filter;
estimating, by the processor, a database statistic about the database column in response to determining that distribution changes that exhibit a statistically significant difference to the database column did not occur; and
updating, by the processor, at least one of a unique entry count, a row count, a frequency of frequencies for a histogram interval, or a frequency of frequencies for an entire histogram statistics about the database column in response to determining that the distribution changes that exhibit a statistically significant difference occurred to the database column, wherein updating the database statistic uses a greater amount of database power and processing resources than estimating the database statistic about the database column.

2. The method of claim 1, wherein the database statistic comprises at least one of a unique entry count, a row count, a frequency of frequencies per histogram interval, and a frequency of frequencies for an entire histogram statistics.

3. The method of claim 1, wherein determining whether the distribution changes that exhibit a statistically significant difference occurred to the database column based on the comparison between the first bloom filter and the second bloom filter includes determining a confidence level associated with a determination that the distribution changes occurred using a statistical test.

4. The method of claim 3, wherein the statistical test is based on at least one of comparing statistical means in two time periods and comparing statistical variances in two time periods.

5. The method of claim 3, wherein the statistical test is a paired t-test in response to the first sample being deemed to be correlated with the second sample.

6. The method of claim 3, wherein the statistical test is a non-parametric test, a Kolmogorov-Smirnov test, another statistical test, or combinations thereof in response to distributions of data contained in the rows failing to conform to normal distribution assumptions.

7. The method of claim 3, wherein updating the database statistic about the database column in response to determining that the distribution change occurred includes updating the database statistic in response to the confidence level being greater than a predetermined confidence level threshold.

8. The method of claim 1, wherein the first sample is at least one percent of the rows in the database column.

9. The method of claim 1, further comprising performing a query plan optimization task based on the database statistic.

10. The method of claim 1, wherein sampling the subset of the modified rows from the database column to generate the second sample includes generating the second sample by combining the first sample with deletions and inserts from the subset of the modified rows.

11. A system comprising:
a processor; and
a memory on which is stored programmed instructions that when executed by the processor are to cause the processor to:
sample rows from a database column in a database to generate a first sample;
after generating the first sample, sample modified rows from the database column corresponding to the sampled rows to generate a second sample;
build a first bloom filter that represents rows of the first sample;
build a second bloom filter that represents rows of the second sample;
determine whether distribution changes that exhibit a statistically significant difference occurred to the database column based on a comparison between the first bloom filter and the second bloom filter;
in response to a determination that distribution changes that exhibit a statistically significant difference occurred based on the comparison, update at least one of a unique entry count, a row count, a frequency of frequencies for a histogram interval, or a frequency of frequencies for an entire histogram statistics about the database column; and
in response to a determination that distribution changes that exhibit a statistically significant difference did not occur based on the comparison, estimate a database statistic about the database column, wherein updating a database statistic uses a greater amount of database power and processing resources than estimating the database statistic about the database column.

12. The system of claim 11, wherein the programmed instructions are further to cause the processor to determine a confidence level of a determination that distribution changes occurred.

13. The system of claim 12, wherein the instructions are further to cause the processor to further use statistical tests to determine the confidence level.

14. The system of claim 13, wherein the statistical test include a two sample t-test, paired t-test, a non-parametric test, a Kolmogorov-Smirnov test, a test based on comparing statistical means of two time periods against each other and a statistical variance of two time periods against each other or combinations thereof.

15. A non-transitory computer readable storage medium comprising computer readable program code embodied therewith, the computer readable program code comprising program instructions that, when executed by a processor, causes the processor to:
sample rows from a database column in a database to generate a first sample;
sample a subset of the rows, the subset including at least one of deleted rows, inserted rows, and updated rows, from the database column after generating the first sample to generate a second sample, the second sample corresponding to the first sample;

build a first bloom filter that represents rows of the first sample;

build a second bloom filter that represents rows of the second sample;

determine whether distribution changes that exhibit a statistically significant difference occurred to the database column based on a comparison between the first bloom filter and the second bloom filter; and update at least one of a unique entry count, a row count, a frequency of frequencies for a histogram interval, or a frequency of frequencies for an entire histogram statistics about the database column in response to a determination that distribution changes that exhibit a statistically significant difference occurred; and estimate a database statistic about the database column in response to a determination that a distribution change that exhibit a statistically significant difference did not occur, wherein updating a database statistic uses a greater amount of database power and processing resources than estimating the database statistic about the database column.

* * * * *